United States Patent Office 3,310,663
Patented Mar. 21, 1967

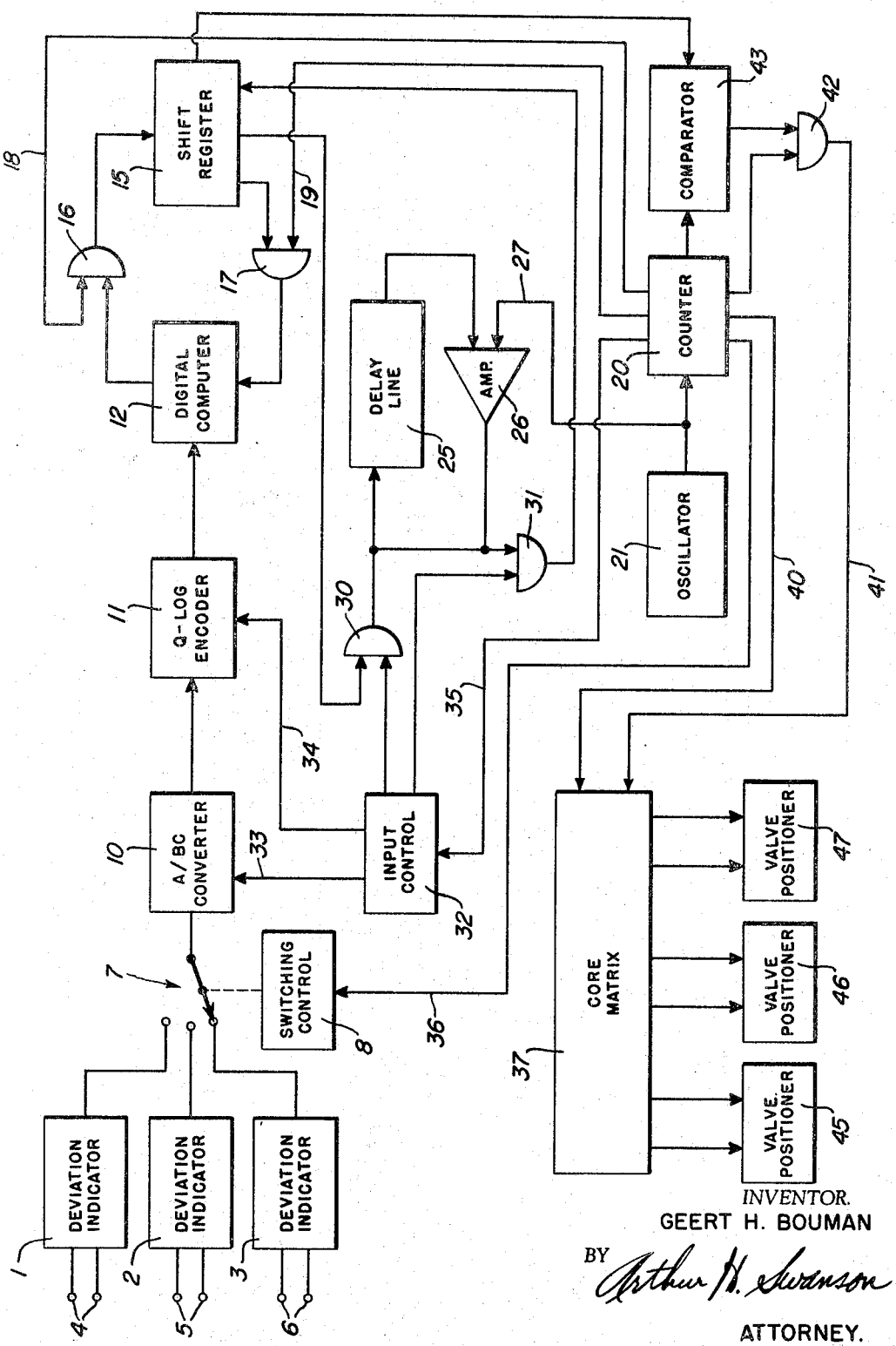

3,310,663
LOGARITHMIC DIGITAL PROCESS CONTROLLER
Geert H. Bouman, Glenside, Pa., assignor to Honeywell Inc., a corporation of Delaware
Filed May 21, 1963, Ser. No. 282,078
3 Claims. (Cl. 235—151.1)

This invention relates to process controllers. More specifically, the present invention relates to digital process control.

An object of the present invention is to provide an improved process controller utilizing a time-shared digital control computer system.

Another object of the present invention is to provide an improved digital process controller operating in a time-shared manner for correcting deviations in a plurality of sensed variables from predetermined setpoints.

Still another object of the present invention is to provide an improved process controller providing time-shared digital output signals for controlling a plurality of digitally responsive process controls.

A further object of the present invention is to provide an improved time-shared digital process controller utilizing logarithmic representations corresponding to process variable variations in a simplified digital computing system.

A still further object of the present invention is to provide an improved digital process controller, as set forth herein, having a simple operation and construction.

In accomplishing these and other objects, there has been provided, in accordance with the present invention, a time-shared digital process controller having input signal means arranged to sequentially sense the setpoint deviation of each of a plurality of process variables. Each error, or deviation, is converted into a binary-coded representation and is further encoded into a logarithmic form representative of the logarithm of a series of error ranges between integral powers of a selected logarithm base. The quasi, or quantized log, is presented as a binary number to a digital computer for use in a mathematical program to provide a computed control signal for reducing the corresponding error. A delay line memory circuit is used to store the computed results based on the quasi-logs, or Q-logs, as the input variables are sequentially scanned. A master timing circuit is used to schedule the operation of the input circuit, the encoding and the digital computation as well as providing a selection signal to an output core matrix in combination with the sensed error of the process variable. The core matrix is arranged to selectively distribute digital control signals to the appropriate process controls whereby the error of the corresponding process variable is reduced in accordance with the computed control operation determined by the digital computer.

A better understanding of the present invention may be had from the following detailed description when read in connection with the accompanying drawing, in which the single figure is a schematic illustration of a digital process controller embodying the present invention.

Referring to the single figure in more detail, there is shown a digital process control computer system including a plurality of process error signal sources, or deviation indicators 1, 2 and 3. The indicators 1, 2 and 3 are arranged to sense a variable of the process to be controlled from respective input terminals 4, 5 and 6 and to provide an error, or deviation, indication signal with respect to preset set-points of each of the sensed variables. The error signals from the indicators 1, 2 and 3 are sequentially scanned by a commutating switch 7 controlled by a switching control 8. The selected error signals are individually converted into a binary form of the analog signal by a converter 10. A log encoder 11 is arranged to take the approximate, or quantized, logarithm of the converter output where the logarithm is defined as:

(base) (logarithm) = number

The approximate logarithm represents the logarithm of a range of numbers between a change in the most significant bit, or bits, of the binary representation. For example, the quasi log, or Q-log, of a series of numbers from 1 to 64 using a base of 2 is as follows:

| Number | Binary Form | Q-Log |
|---|---|---|
| 1 | 0000001 | 1 |
| 2-3 | 000001X | 2 |
| 4-7 | 00001XX | 3 |
| 8-15 | 0001XXX | 4 |
| 16-31 | 001XXXX | 5 |
| 32-63 | 01XXXXX | 6 |
| 64-127 | 1XXXXXX | 7 |

Thus, the Q-log represents ranges of converted error signals received from the converter 10. If the error is large, the Q-log is a rough approximation of the error. On the other hand, for small errors, the Q-log approaches the error. Accordingly, the Q-log may be used to effect an approximate control of a process variable when the variable has a large error with respect to a set-point and to produce a close, or fine, control when the error of the variable is small. Since the desired control of a process having a large set-point error is only to reduce the error as quickly as possible, the fact that the Q-log represents a range of error signals is not material to the accuracy of the control operation. When the error signal represents a small deviation, the Q-log is concurrently a closer representation of the actual error and a close control of the process variable may be maintained.

In the aforesaid example, the base for the Q-log was chosen as the number 2 which produced ranges of errors between numbers representing integral powers of two. If these ranges are not suitable for a particular application, other bases may be selected which produces smaller ranges of error signal between integral powers of the base; e.g., the base could be $$\sqrt{2}, \sqrt[3]{2}$$

etc. These smaller bases would produce smaller ranges of error signals and the Q-log would approach the error more quickly than the illustrated base of 2. The following table illustrates the Q-log of the numbers 1 to 95 using a base of $\sqrt{2}$:

| Number | Binary Form | Q-Log |
|---|---|---|
| 1 | 0000001 | 1 |
| 2 | 0000010 | 3 |
| 3 | 0000011 | 4 |
| 4-5 | 000010X | 5 |
| 6-7 | 000011X | 6 |
| 8-11 | 00010XX | 7 |
| 12-15 | 00011XX | 8 |
| 16-23 | 0010XXX | 9 |
| 24-31 | 0011XXX | 10 |
| 32-47 | 010XXXX | 11 |
| 48-63 | 011XXXX | 12 |
| 64-95 | 10XXXXX | 13 |

The Q-log is effectively related to the position of the highest binary "one" state in the binary error signal if the base of 2 is used. However, in all cases, the Q-log is related to the change in significant bits of the binary error signal. Thus, the encoder 11, which is effective to produce a binary representation of the Q-log, may be simply a core matrix arranged to sense the binary error signal from the converter 10 and having the core input windings interrelated to produce a succession of output signals from the combination of the core sense windings. For example, assuming a simplified matrix of four cores and a Q-log base of 2, an input error signal corresponding to a binary "one" in the range of 8 to 15 would be arranged by the placement of the core input windings to produce an output signal only on the fourth core sense winding for a binary combined output from the four cores of 1000 which is a binary representation of the binary "one" position which is represented by the Q-log of 4. A zero error would produce a binary indication from the converter 10 and could be handled by a separate circuit in the encoder 11 or a program in a computer 12 which would recognize that the process variable was as the set point.

The binary form of the Q-log from the encoder 11 is selectively applied to a digital computer 12. This distribution is controlled by an input control 32 which is aranged to apply a timing signal to the encoder 11 to initiate the read-out of the Q-log signal. Since the error signal is in logarithmic form, the mathematical computations of the digital computer 12 involving multiplication and division are simplified since these are accomplished by addition and substraction, respectively, while the operations of addition and subtraction are performed by a comparison of logarithms. Further, the computer storage and handling facilities are greatly reduced by having to handle only a minimum digit binary logarithm rather than the large direct binary error signal. A shift register 15 is used to temporarily store binary information either to be used in the computer 12 or representing the result of the mathematical computations performed by the computer 12. The binary information from the computer 12 is gated into the register 15 through a gate circuit 16. Similarly, the binary information from the shift register 15 is fed into the computer 12 through a gate circuit 17. The gating operation of the gates 16 and 17 is controlled by a gating signal selectively applied over lines 18 and 19, respectively. The gating signal is derived from a master counter means 20 having a plurality of counting stages. The counter 20 is driven by a synchronizing oscillator 21. The output signals from the oscillator are used as a basic timing signal which is subdivided by the counter 20 to synchronize the operation of the computer system. Thus, the counter 20 is used to provide timing control signals for the computer system by having a plurality of output circuits formed from the stages of the counter 20 representative of different counts in the counter 20 of the cycles of the oscillator 21. Further, the oscillator output signal is applied to a memory circuit comprising a delay line 25 and a feedback amplifier 26.

The delay line 25 is arranged to store signals by providing a delay between a delay line input signal and a delay line output signal. Thus, an entire sequence of rapidly arriving input pulses may be fed into the delay line for storage before the first stored input pulse arrives at the output of the delay line. The amplifier 26 is arranged in a feedback loop of the delay line 25 to provide a reentry of the output signals from the delay line to the delay line input circuit. Thus, the signals stored by the delay line 25 may be recirculated therein to provide a continuous storage function. The amplifier 26 is synchronized with the operation of the delay line 25 to provide the aforesaid feedback operation at the time output signals appear from the delay line 25 by a synchronizing signal applied along line 27 from the oscillator 21. Thus, the amplifier 26 is triggered into conduction by the synchronizing signal at the time an output signal from the delay line 25 is available for recirculation.

The delay line 25 is connected to the computer system by an input gate 30 and an output gate 31. The gates 30 and 31 are used to insert information signals for storage in the delay line 25 and to read-out stored information for use by the computer system, respectively. A selective energizing control signal is applied to either gate 30 or gate 31 from an input control 32. The input control 32 is also arranged to provide an energizing control signal to the converter 10 along a control line 33 and to the encoder 11 along a control line 34. The aforesaid control signals from the input control 32 are selectively distributed by appropriate delay and amplifier circuits in the input control 32 in response to synchronizing signals from the counter 20 applied along plural lines shown as line 35. In addition, the switching control 8 is selectively controlled to effect a stepping operation of the switch 7 by a control signal from the counter 20 fed along line 36.

An output signal from the shift register 15, representing a computer system control signal for the process under control, is used to control the process by a signal distributing core matrix 37. The core matrix 37 uses saturable magnetic cores having input windings arranged to select a core according to the coded energization of a plurality of input wires, represented by line 40, energized by a portion of the counter 20. The operation of the core matrix 37 is further controlled by an inhibit signal which is applied to prevent an output signal from appearing on the output windings of the cores in the matrix 37. This inhibit signal is applied on line 41 from a gate circuit 42 controlled by a control signal from the counter 20 in combination with an output signal from a signal comparator 43. The comparator 43 is arranged to compare a count in the counter 20 and a binary number appearing in the shift register 15 and to produce an output signal upon a predetermined relationship therebetween.

The output signals from the core matrix 37, after suitable amplification, are applied to process control devices, such as, valve positioners 45, 46 and 47. These valve positioners are controlled to provide an end result in the controlled process which produces a decrease in the process variable errors sensed by the deviation indicators 4, 5 and 6. The valve positioners 45, 46 and 47 may each be devices as shown in the copending application of Geert H. Bouman, entitled, Electrical Apparatus, filed on Mar. 29, 1963, having Ser. No. 269,005 and assigned to a common assignee.

In operation, the computer control system of the present invention is effective to receive error signals, representative of deviations from pre-set set-points of sensed process variables, from the deviation indicators 1, 2 and 3. These error signals are converted into binary form by the converter 10 and into Q-log form by the encoder 11. The converter 10 and the encoder 11 are synchronized by signals from input control 32 to provide an output signal from the encoder 11 when a conversion by the converter 10 is completed. Further, the stepping switch 7 is controlled by the switching control 8 to select a new input error signal when the previous signal has passed through the converter 10 and the encoder 11. The energizing signals for the switching control 8 and input control 32 are supplied by counter 20 and represent different counts of the counter 20. These counts are selected to allow for proper operation of the converter 10 and encoder 11. Thus, the energizing signals would occur at a time when the previously energized control system step was completed.

The Q-log signal is applied to the computer 12 and is utilized in mathematical manipulations to provide a control signal for a corresponding output device. This control signal determines the number of incremental steps that are required by the output device to reduce the error in the sensed process variable. In other words, each output device will have a computed command to determine the number of steps that will eliminate the error in the process variable which gave rise to the computed control signal. The control signal from the computer 12 is read into the shift register 15 through gate 16 which gate is triggered by a synchronizing count signal from the counter 20. Similarly, the information in the shift register may be read into the computer 12 through gate 17 which is, also, triggered by the counter 20. The purpose of the computer 12 and the register 15 is to update the control information for each of the output devices controlled by the process controller. Thus, each time an input signal is sampled by the switch 7, the computer 12 produces a new control signal which is fed into the register 15. The register 15 is arranged to read out this new control signal to the delay line 25 through gate 30. The information stored in the delay line 25 comprises computed data from the computer 12. This stored information is continuously circulated in the delay line 25 through a feedback circuit including the amplifier 26 which amplifier is triggered by the oscillator 21.

The input control 32 is arranged to selectively control the read-in or read-out of information with respect to the delay line 25. Thus, the input gate 30 is triggered to read-in data from the shift register 15 to the delay 25. Similarly, the output gate 31 is triggered to read-out information from the delay line 25 to the register 15. The input control 32 is synchronized by a count signal from the counter 20. Thus, the counter 20 is arranged to count the cycles of the oscillator 21 and to produce a plurality of individual count signals which are applied to the system elements to synchronize the operation thereof. When the counter 20 has gone through a complete cycle; i.e., zero count to maximum count, the control system has been triggered through a complete cycle of sampling each of the variables, converting each to a Q-log, computing the control signal, storing the control signal and selectively applying the effect of the control signal to each of the ouptut devices 45, 46 and 47.

The output devices 45, 46 and 47 may be valve positioners, as previously mentioned, which are arranged to affect a process which is being monitored by the transducers connected to the input terminals 4, 5 and 6. Thus, the valve positioners are each arranged to respond to a signal pulse to incrementally change a valve position. The valve position is varied in a direction to adjust the sensed variable to zero set point error. This zero set point error is effective to terminate an error signal from the corresponding one of the deviation indicators 1, 2 and 3. The error signals from the indicators 1, 2, 3 are used to produce corresponding Q-logs. These Q-logs are used to control the adjustment of the valve positioners 45, 46 and 47 by controlling the driving signals therefor. The driving pulses for the valve positioners 45, 46 and 47 are derived from a core matrix 37. The matrix 37 may be a magnetic core matrix having a plurality of cores with a plurality of input signal lines arranged in a coded pattern formed by the input lines being either wound on a core or passing around a core. Each of the cores has an output winding arranged to supply a pulse signal to an output device. Thus, a particular core is selected by energizing a number of the input lines in a coded pattern which pattern may represent a count in a counter. The selected core is, then, energized with a driving signal from a self-contained source to produce an output signal on the output winding. The cores are provided with an additional winding, called and inhibit winding, which is arranged to magnetically saturate the cores by an inhibit signal whereby a transfer of a driving signal to an output winding is prevented. The plurality of input lines for the matrix 37 are represented by line 40 in the single figure drawing and the inhibit line is line 41. Thus, a count in the counter 20 is effective to select a core in the matrix 37.

As the count progresses during the counting of the signals from the oscillator 21, the counter 20 is effective to sequentially select each of the cores in the matrix 37. However, the core selection count which selects the cores in the matrix 37 is effective to select all the cores to provide a complete cycle of control for the output devices 45, 46 and 47. Thus, the computed control signal for each core and associated output device is effective to adjust the output device through the desired number of incremental steps before a new control signal is computed by the computer 12. This type of operation is effected by having the count selecting the core matrix 37 come from a lower count level in the counter 20 than the count controlling the input error signal cycle. In order to control the core selection in the matrix 37, a core output signal is allowed only during the time that the inhibit signal is suspended. The inhibit signal, applied on line 41, is derived from a gate 42. The gate 42 is energized by an output signal from a comparator 43 and a count signal from the counter 20. The comparator 43 is arranged to compare an output magnitude signal in the shift register 15 supplied from the delay line 25 with a number count in the counter 20 identifying the output scan cycle, while the aforesaid lower count is effective to complete a cycle of sequentially selecting matrix cores for controlling an output device. If this comparison indicates a need for a control adjustment, the decision is made to supply a signal pulse to the output device. Accordingly, the inhibit signal on line 41 is suspended and an output pulse is applied to the output device selected at the time in the core matrix 37 by the lower number count.

A decision not to supply an output signal from the core matrix 37 is indicated by a continuance of the inhibit signal during the time a particular core has been selected by the counter 20. Thus, the core matrix 37 will supply an output signal from each selected core to a respective output device which indicates the need for a change in the condition of the variable. Conversely, if no change in the sensed variable is indicated or the change has already been effected during earlier output scan cycles, the selected core will be inhibited and the respective output device will not be supplied with a driving pulse. The information for each sensed variable stored in the delay line is periodically revised by the operation of the input system of the process controller comprising the switch 7, converter 10, encoder 11, computer 12 and register 15. Thus, the output devices 45, 46 and 47 are adjusted according to the number of steps in the corresponding computed control signal while the corresponding process variables are intermittently sensed to determine an error-eliminating control signal for each of the output devices and carry out the adjustment of the control devices before a new control signal is computed.

Accordingly, it may be seen that there has been provided, in accordance with the present invention, a digital time-shared process controller having a digital computer for controlling digitally responsive process controls and operating in a time-shared relation with a plurality of process variables and process controls which controller is characterized by an approximate logarithmic conversion of process errors to effect a simplification of the digital computer.

What is claimed is:

1. A process controller comprising a plurality of input signal means arranged to be connected to respective signal sources representative of monitored process variables, said input signal means including error means each operative to provide an indication of a deviation of a corresponding variable from a setpoint, switching means operative to sequentially select said indication from each of said error means, analog to digital converting means operative to convert each selected indication to a digital signal, encoding means operative to encode each digital signal to a digital representation of an approximate logarithm thereof, digital computer means responsive to an output signal from said encoding means and operative to compute a control signal for each monitored variable and means for distributing said control signal for each variable to a process control operative to affect the corresponding monitored variable, said last mentioned means including a memory means operative to store said control signal for each variable, and readout means operative to sequentially affect each process control in response to a respective stored control signal to reduce said deviation.

2. A process controller as set forth in claim 1 wherein said computing means includes a signal memory means for storing computed control signals for varying corresponding process controls in response to respective sensed process variable errors and memory input and output means operative to read-out the control signals to said distributing means and to read-in new control signals from said digital computer.

3. A process controller as set forth in claim 1, wherein said means for distributing includes an oscillator means, counter means counting a frequency signal from said oscillator means and core matrix means having cores sequentially selected by a count in said counter to supply energizing signals to all of the process controls in response to corresponding computed control signals.

References Cited by the Examiner
UNITED STATES PATENTS

| | | | |
|---|---|---|---|
| 3,039,687 | 6/1962 | Chope | 235—151.1 XR |
| 3,174,298 | 3/1965 | Kleiss | 235—151.1 XR |
| 3,219,994 | 11/1965 | James | 340—347 |

OTHER REFERENCES

Pages 77–86, August 1960, "Numerical Control," Automation.

MALCOLM A. MORRISON, *Primary Examiner.*

A. J. SARLI, *Assistant Examiner.*